(12) United States Patent
Kawaai et al.

(10) Patent No.: US 10,890,822 B2
(45) Date of Patent: Jan. 12, 2021

(54) MACH-ZEHNDER OPTICAL MODULATOR

(71) Applicant: FUJITSU LIMITED, Kawasaki (JP)

(72) Inventors: Shigeki Kawaai, Kawasaki (JP);
Hirotomo Izumi, Kawasaki (JP);
Manabu Yamazaki, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/527,108

(22) Filed: Jul. 31, 2019

(65) Prior Publication Data

US 2020/0089075 A1    Mar. 19, 2020

(30) Foreign Application Priority Data

Sep. 18, 2018 (JP) ................. 2018-173628

(51) Int. Cl.
| | |
|---|---|
| *G02F 1/225* | (2006.01) |
| *H04B 10/548* | (2013.01) |
| *G02F 1/01* | (2006.01) |
| *G02F 1/21* | (2006.01) |

(52) U.S. Cl.
CPC ............ *G02F 1/225* (2013.01); *G02F 1/0121* (2013.01); *H04B 10/548* (2013.01); *G02F 2001/212* (2013.01)

(58) Field of Classification Search
CPC .. G02F 1/225; G02F 1/0121; G02F 2001/212; H04B 10/548
USPC .......................................................... 385/2
See application file for complete search history.

(56) References Cited

U.S. PATENT DOCUMENTS

| | | | |
|---|---|---|---|
| 10,180,617 B1* | 1/2019 | Takei ................... | G02F 1/3136 |
| 2005/0254743 A1 | 11/2005 | Akiyama et al. | |
| 2009/0269017 A1* | 10/2009 | Maruyama ......... | G02B 6/12004 |
| | | | 385/132 |
| 2015/0110500 A1 | 4/2015 | Noguchi | |
| 2015/0277158 A1 | 10/2015 | Akiyama | |
| 2015/0280832 A1 | 10/2015 | Fujikata et al. | |

FOREIGN PATENT DOCUMENTS

| | | |
|---|---|---|
| JP | 2005-326548 A | 11/2005 |
| JP | 2015-191067 A | 11/2015 |
| JP | 2015-191185 A | 11/2015 |
| WO | 2013/161196 A1 | 10/2013 |

* cited by examiner

*Primary Examiner* — Jerry M Blevins
(74) *Attorney, Agent, or Firm* — Fujitsu Patent Center

(57) ABSTRACT

A Mach-Zehnder optical modulator includes: a Mach-Zehnder interferometer that includes first and second arms formed on a silicon substrate, and a controller that controls bias current of the first and second arms. The controller controls the bias current of the first and second arms respectively to be a first offset value. The controller repeatedly executes a current adjustment process to increase the bias current of the first arm until a gradient of a phase shift amount of the first arm with respect to the bias current of the first arm reaches a target value. The controller controls the bias current of the second arm to be a second offset value that is smaller than the first offset value. The controller repeatedly performs the current adjustment process to increase the bias current of the first arm until a phase difference of the Mach-Zehnder interferometer reaches a target phase difference.

7 Claims, 13 Drawing Sheets

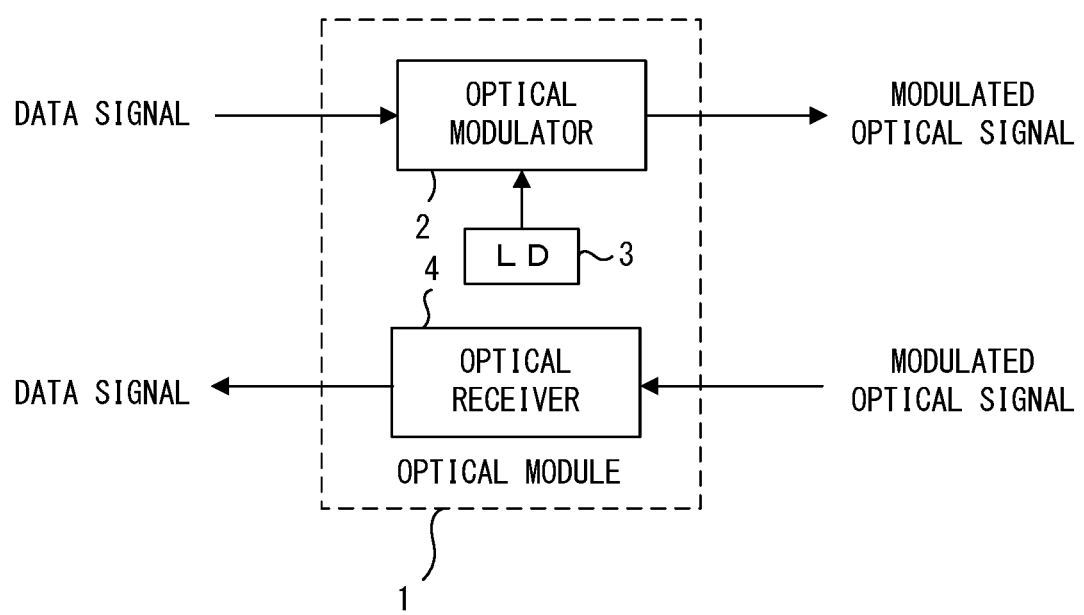
F I G. 1

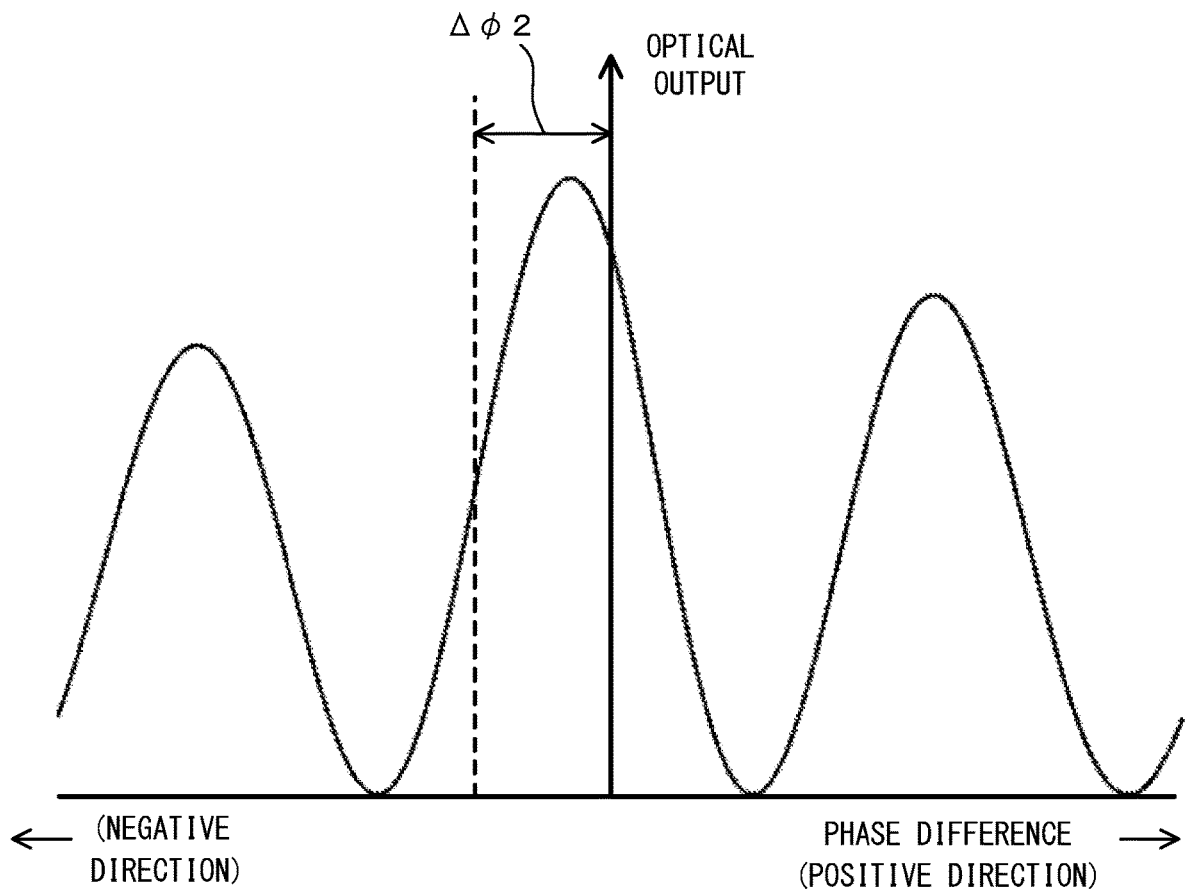
F I G. 4 A
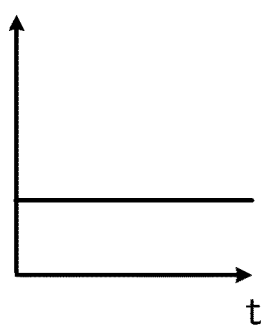 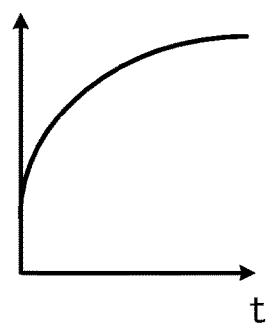
F I G. 4 B

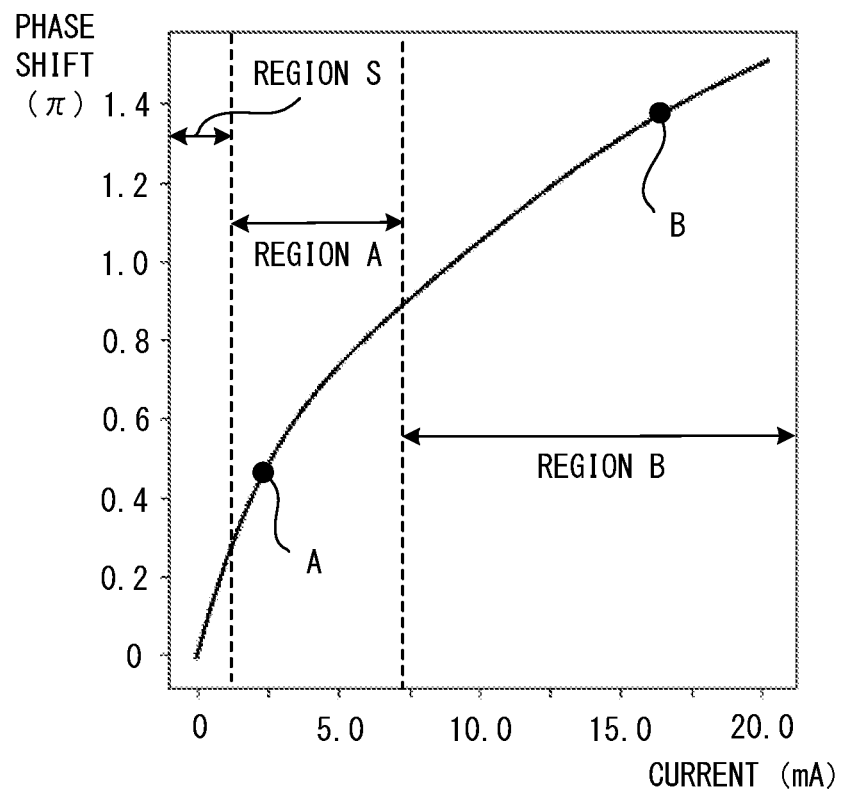
F I G. 5

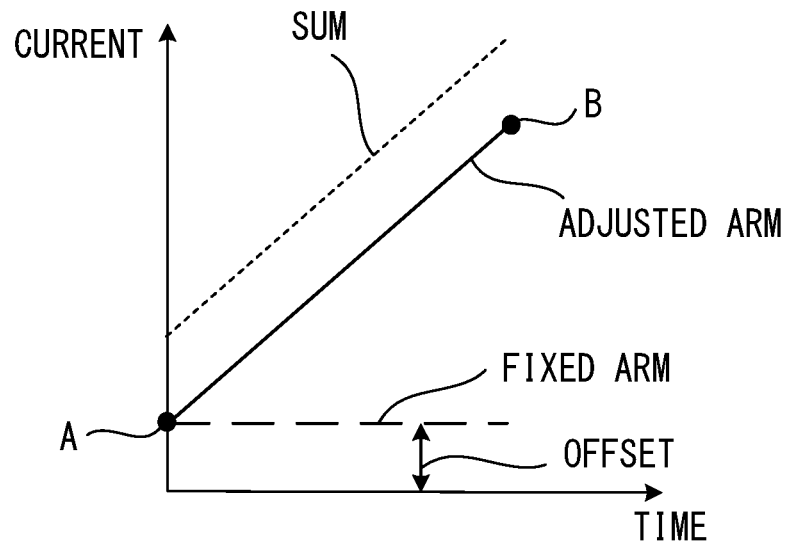
F I G. 6 A
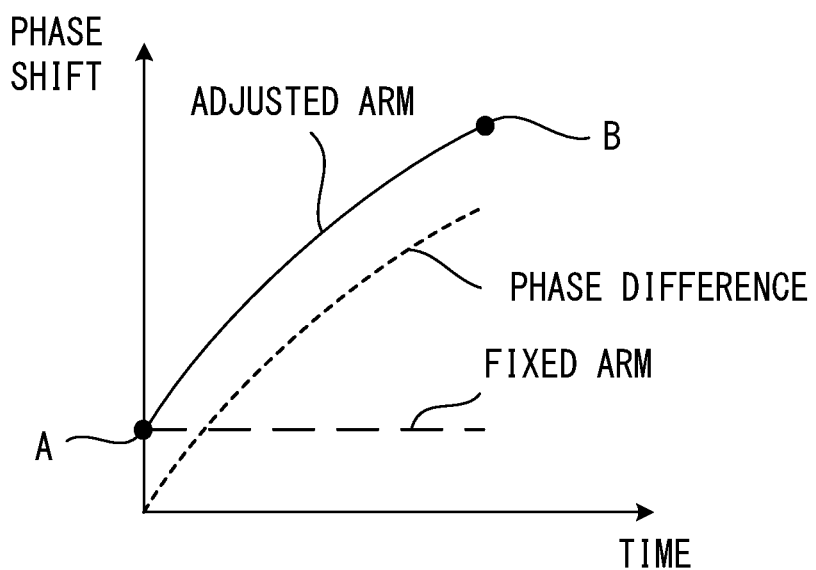
F I G. 6 B

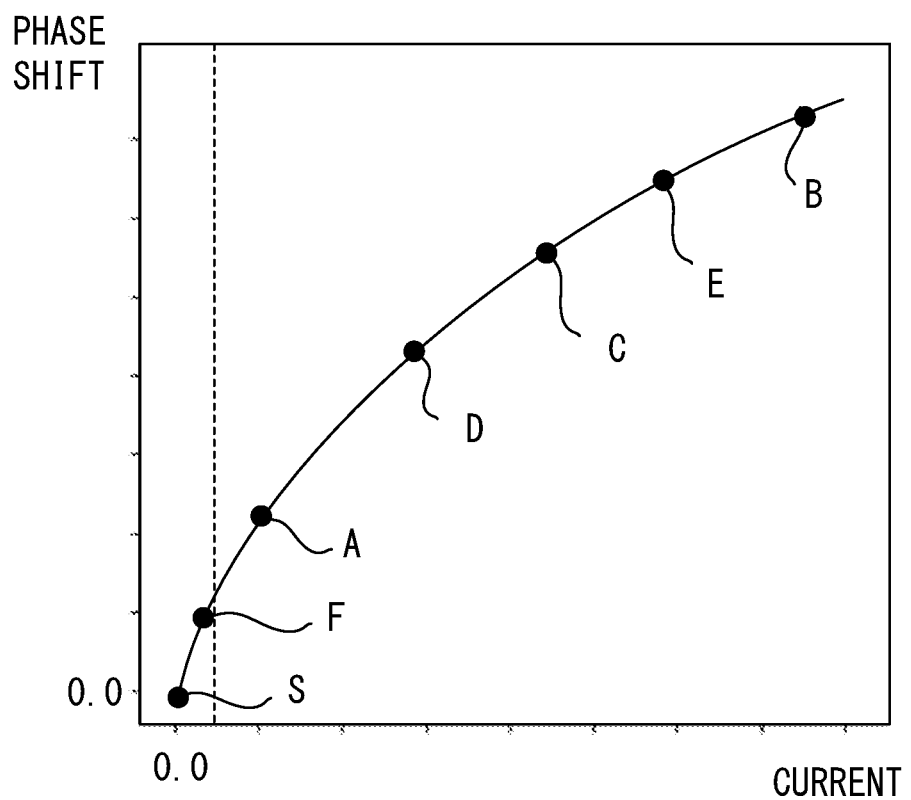
F I G. 8

|  | FIXED ARM (mA) | ADJUSTED ARM (mA) |
|---|---|---|
| AT THE TIME OF RESET | 1.00 (OFFSET) | 13.37 (POINT C) |
| AFTER REST | 0.50 (SECOND OFFSET) | 9.41 (POINT D) |

FIG. 9

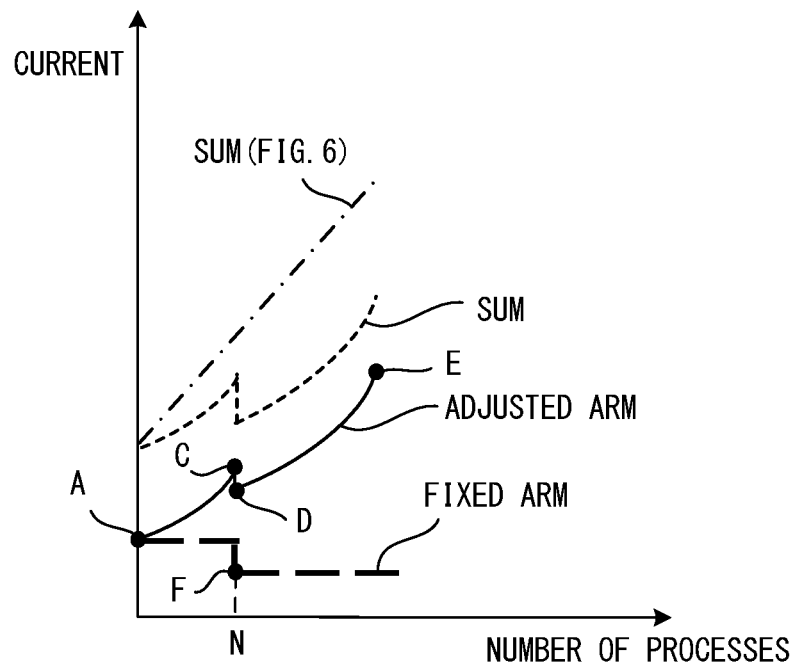
F I G. 1 2 A
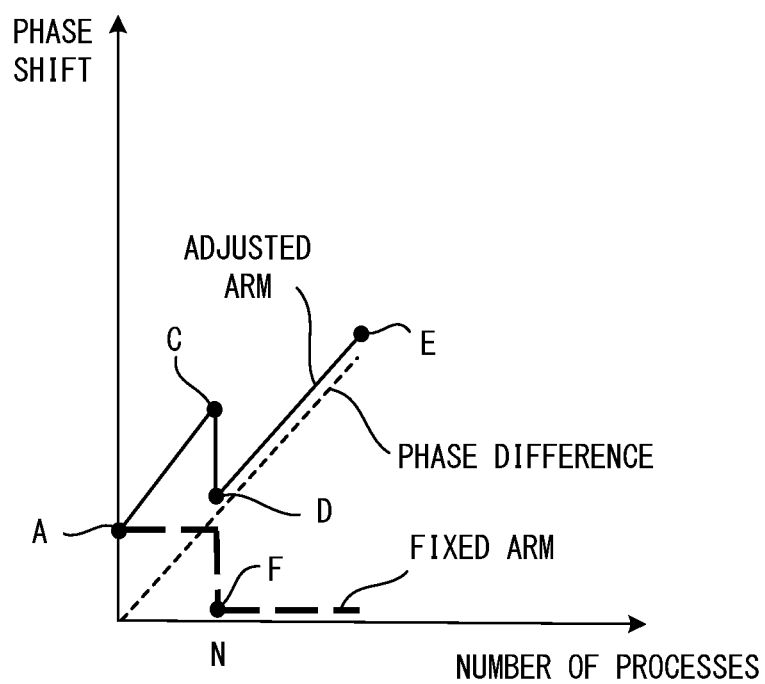
F I G. 1 2 B

| CURRENT RANGE (mA) | AMOUNT OF INCREASE |
|---|---|
| 0~1.00 | $\Delta i$ |
| 1.01~3.61 | $2 \times \Delta i$ |
| 3.62~6.10 | $3 \times \Delta i$ |
| 6.11~13.38 | $4 \times \Delta i$ |
| 13.39~16.47 | $5 \times \Delta i$ |
| 16.48~19.26 | $6 \times \Delta i$ |

FIG. 13

MACH-ZEHNDER OPTICAL MODULATOR

CROSS-REFERENCE TO RELATED APPLICATIONS

This application is based upon and claims the benefit of priority of the prior Japanese Patent Application No. 2018-173628, filed on Sep. 18, 2018, the entire contents of which are incorporated herein by reference.

FIELD

The embodiments discussed herein are related to a Mach-Zehnder optical modulator and an optical module that includes a Mach-Zehnder optical modulator.

BACKGROUND

The Mach-Zehnder optical modulator has been widely put to practice as one of main parts for realizing large-volume long-distance communication. The Mach-Zehnder optical modulator is equipped with a pair of arms (the first arm and the second arm). Each of the arms is formed by an optical waveguide. In addition, continuous wave light is input to each of the arms.

The refractive index of the optical waveguide of each of the arms may be controlled by an electric signal. That is, the phase of the output light of each arm may be controlled using an electric signal. Therefore, the Mach-Zehnder optical modulator can generate a modulated optical signal that represents the supplied electric signal.

For example, when electric signals are supplied with which the phase of the output light of the first arm and the phase of the output light of the second arm become the same as each other, the power of the output light of the Mach-Zehnder optical modulator becomes large. Meanwhile, when electric signals are supplied with which the phase of the output light of the first arm and the phase of the output light of the second arm become the inverted phase to each other, the power of the output light, of the Mach-Zehnder optical modulator becomes small. In this case, the Mach-Zehnder optical modulator generates an intensity modulated optical signal. Therefore, when an electric signal representing data is supplied, the Mach-Zehnder optical modulator can generate a modulated optical signal that transmits the data.

Meanwhile, there has been an increasing need for making the optical module including the optical modulator smaller. For this reason, development of the silicone modulator instead of the conventional LN modulator has been underway. Then, the Mach-Zehnder silicone modulator has been put to practice. Note that the silicone modulator is composed by forming optical waveguides on a silicone substrate using semiconductor manufacturing techniques.

The Mach-Zehnder optical modulator is described, for example, in WO2013/161196, Japanese Laid-open Patent Publication No. 2015-191067, Japanese Laid-open Patent Publication No. 2005-326548, Japanese Laid-open Patent Publication No. 2015-191185.

It is preferable for the Mach-Zehnder silicone modulator to generate the modulated optical signal with a high conversion efficiency. Then, in order to realize a high compensation efficiency, the operation point of the Mach-Zehnder optical modulator needs to be appropriately adjusted. Here, the conversion efficiency may represent the amplitude of the output optical signal with respect to the amplitude of the input electric signal. That is, it is preferable for the Mach-Zehnder silicone modulator that its operation point is adjusted so that the amplitude of the output optical signal of the Mach-Zehnder silicone modulator becomes large. Note that the operation point of the Mach-Zehnder optical modulator is adjusted by controlling the bias current supplied to one or both of the arms.

However, when the operation point is adjusted by conventional techniques, the bias current supplied to each arm may become large. Here, when the bias current is large, the phase shift amount of the Mach-Zehnder interferometer becomes large, and the optical transmission loss in the Mach-Zehnder silicone modulator may increase. Then, in order to generate a modulated optical signal of a prescribed output optical power while the optical transmission loss in the Mach-Zehnder silicone modulator is large, the optical transmission loss needs to be compensated for by increasing the output power of the laser light source. Accordingly, the current consumption of the laser light source becomes large, causing an increase the current consumption of the optical module including the Mach-Zehnder silicone modulator and the laser light source.

SUMMARY

According to an aspect of the present invention, a Mach-Zehnder optical modulator includes: a Mach-Zehnder interferometer that includes a first arm and a second arm formed on a silicon substrate, and a current controller that controls bias current of the first arm and the second arm. The current controller is configured to control the bias current of the first arm and the bias current of the second arm respectively to be a first offset value, to repeatedly execute a current adjustment process to increase the bias current of the first arm until a gradient of a phase shift amount of the first arm with respect to the bias current of the first arm reaches a specified target value, to control the bias current of the second arm to be a second offset value that is smaller than the first offset value, and to repeatedly perform the current adjustment process to increase the bias current of the first arm until a phase difference of the Mach-Zehnder interferometer reaches a specified target phase difference.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical module that includes an optical modulator according to an embodiment of the present invention;

FIGS. 4A and 4B illustrate another example of a method for adjusting the operation point of the Mach-Zehnder interferometer;

FIG. 5 illustrates an example of the relationship between the current supplied to the arm of the Mach-Zehnder interferometer and the phase shift.

FIGS. 6A and 6B illustrate an example of a method for adjusting the phase difference of the Mach-Zehnder interferometer.

FIG. 8 illustrates an example of the change in the current supplied to the arms of the Mach-Zehnder interferometer and in the phase shift, in the adjustment illustrated in FIG. 7;

FIG. 9 illustrates an example of reset information;

FIGS. 12A and 12B illustrate an example of a method for adjusting the phase difference of the Mach-Zehnder interferometer in the optical modulator according to the second embodiment; and FIG. 13 illustrates an example of the relationship between the bias current and the amount of increase in the bias current in a current adjustment process.

DESCRIPTION OF EMBODIMENTS

Figure 2:
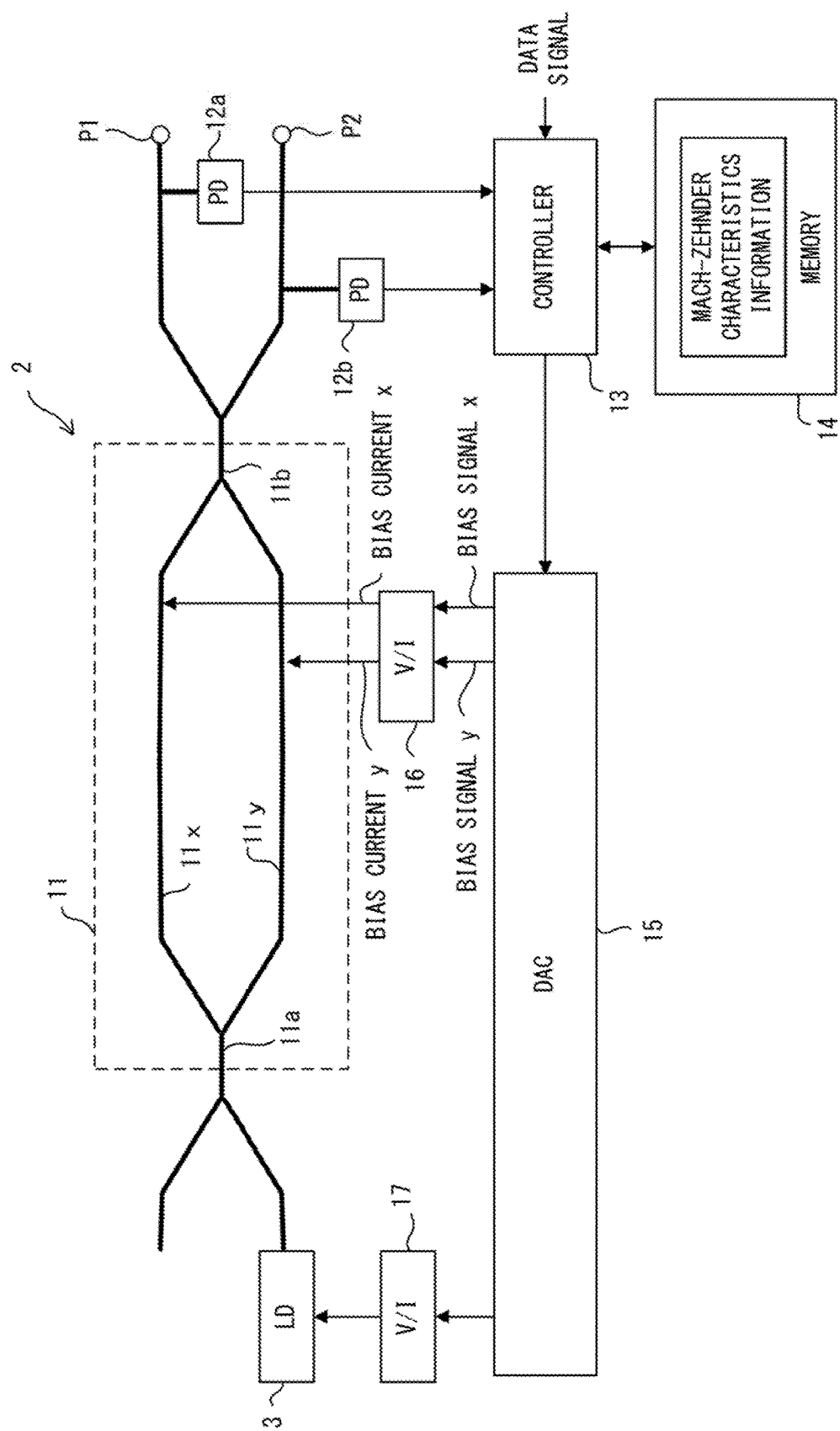
FIG. 2 illustrates an example of an optical modulator according to an embodiment of the present invention.

FIG. 1 illustrates an example of an optical module that includes an optical modulator according to an embodiment of the present invention. In this example, an optical module 1 is an optical transceiver and is equipped with an optical modulator 2, a laser light source 3, and an optical receiver 4. Meanwhile, the optical module 1 may be equipped with other circuit elements that are not illustrated in the drawings. In addition, the optical module 1 does not need the optical receiver 4. That is, the optical module 1 may also be an optical transmitter.

The optical modulator 2 modulates continuous wave light generated by the laser light source 3 with a data signal to generate a modulated optical signal. The optical modulator 2 is a Mach-Zehnder optical modulator equipped with a Mach-Zehnder interferometer, in this example. In addition, the optical modulator 2 is formed on a silicone substrate. That is, the optical modulator 2 is a Mach-Zehnder silicone modulator. The optical receiver 4 is, for example, a coherent receiver. In this case, the optical receiver 4 may recover a data signal from a modulated optical signal using the continuous wave light generated by the laser light source 3.

Meanwhile, in the example illustrated in FIG. 1, the optical module 1 is equipped with one pair of the optical modulator 2 and the optical receiver 4, but the present invention is not limited to this configuration. That is, the optical module 1 may be equipped with a plurality of pairs of the optical modulators 2 and the optical receivers 4.

FIG. 2 illustrates an example of the optical modulator according to an embodiment of the present embodiment. The optical modulator 2 is implemented on the optical module 1 illustrated in FIG. 1, for example. The optical modulator 2 is equipped with a Mach-Zehnder interferometer 11, photo detectors 12a, 12b, a controller 13, a memory 14, a digital-to-analog converter (DAC) 15, and voltage-to-current converters (V/I) 16, 17. Meanwhile, the optical modulator 2 may also be equipped with other circuit elements that are not illustrated in FIG. 2.

The Mach-Zehnder interferometer 11 is realized by optical waveguides formed on a silicone substrate. Specifically, the Mach-Zehnder interferometer 11 is composed of a branching optical waveguides 11a, a first arm waveguide 11x, a second arm waveguide 11y, and a combining optical waveguide 11b. The branching optical waveguide 11a branches the input light and guides it to the first arm waveguide 11x and the second arm waveguide 11y. The first arm waveguide 11x and the second arm waveguide 11y respectively propagate the input light. Meanwhile, the length of the first arm waveguide 11x and the length of the second arm waveguide 11y are substantially the same as each other. The combining optical waveguide 11d combines the output light of the first arm waveguide 11x and the output light of the second arm waveguide 11y.

The output light of the Mach-Zehnder interferometer 11 is guided to optical ports P1 and P2. Here, the phase of the light guided to the optical port P1 and the phase of the light guided to the optical port P2 are inverted with respect to each other. For example, the modulated optical signal generated by the optical modulator 2 is output to the network via the port P1.

The photo detectors 12a, 12b respectively convert the output light of the Mach-Zehnder interferometer 11 into an electric signal. That is, the photo detector 12a converts the light guided to the optical port P1 into an electric signal, and the photo detector 12b converts the light guided to the optical port P2 into an electric signal.

The controller 13 generates a bias signal for controlling the operation point of the Mach-Zehnder interferometer 11. Specifically, the controller 13 generates a bias signal x for controlling the phase shift of the first arm waveguide 11x and a bias signal y for controlling the phase shift of the second arm waveguide 11y. The bias signals x, y are respectively converted into an analog signal by the digital-to-analog converter 15, and converted into bias currents x, y by the voltage-to-current converter 16. Then, the bias current x is supplied to the first arm waveguide 11x, and the bias current y is supplied to the second arm waveguide 11y. Meanwhile, the controller 13 may generate the bias signal using the result of monitoring by the photo detectors 12a, 12b. In this case, the controller 13 controls the bias currents x, y according to the power of the output light of the Mach-Zehnder interferometer 11.

The controller 13 generates a driving signal according to the data signal. The driving signal is differential signals, for example. In this case, one of the differential signals is given to the first arm waveguide 11x, and the other of the differential signals is given to the second arm waveguide 11y. The driving signal is converted into an analog signal by the digital-to-analog converter 15, converted into a current signal by the voltage-to-current converter 16 and is given to the Mach-Zehnder interferometer 11. At this time, the driving signal may be superimposed on the bias signal and given to the Mach-Zehnder interferometer 11, or it may be given to the Mach-Zehnder interferometer 11 via a path different from that for the bias signal.

The controller 13 generates a power control signal for controlling the power of the laser light source 3. At this time, the controller 13 may refer to the result of monitoring by the photo detectors 12a, 12b and may control the laser light source 3 so that the power of the output light of the Mach-Zehnder interferometer 11 becomes closer to be the target level. Meanwhile, the power control signal is converted into an analog signal by the digital-to-analog converter 15, converted into a current signal by the voltage-to-current converter 17 and given to the laser light source 3.

The memory 14 stores Mach-Zehnder characteristics information. The Mach-Zehnder characteristics information represents the characteristics of the Mach-Zehnder interferometer 11, while this is explained later. Meanwhile, the memory 14 may be implemented in the controller 13.

In the optical modulator 2 configured as described above, the controller 13 optimizes the operation point of the Mach-Zehnder interferometer 11. At this time, the controller 13 decides the bias currents x, y so as to optimize the operation point of the Mach-Zehnder interferometer 11. After this, the data signal is given to the optical modulator 2. Therefore, the optical modulator 2 can generate a modulated optical signal representing the data signal at the optimized operating point.

Meanwhile, the controller 13, the digital-to-analog converter 15, and the voltage-to-current converter 16 control the bias current that is supplied to the first arm waveguide 11x and the second arm waveguide 11y of the Mach-Zehnder interferometer 11. Therefore, the controller 13, the digital-to-analog converter 15, and the voltage-to-current converter 16 are an example of a current controller that controls the bias current of the Mach-Zehnder interferometer 11.

The controller 13 is realized by a processor system that includes a processor and a memory, for example. In this case, the processor provides the functions of the controller 13 by executing a program stored in the memory. Here, a part or the entirety of the functions of the controller 13 may be realized by a digital signal processing circuit.

Figure 3A:
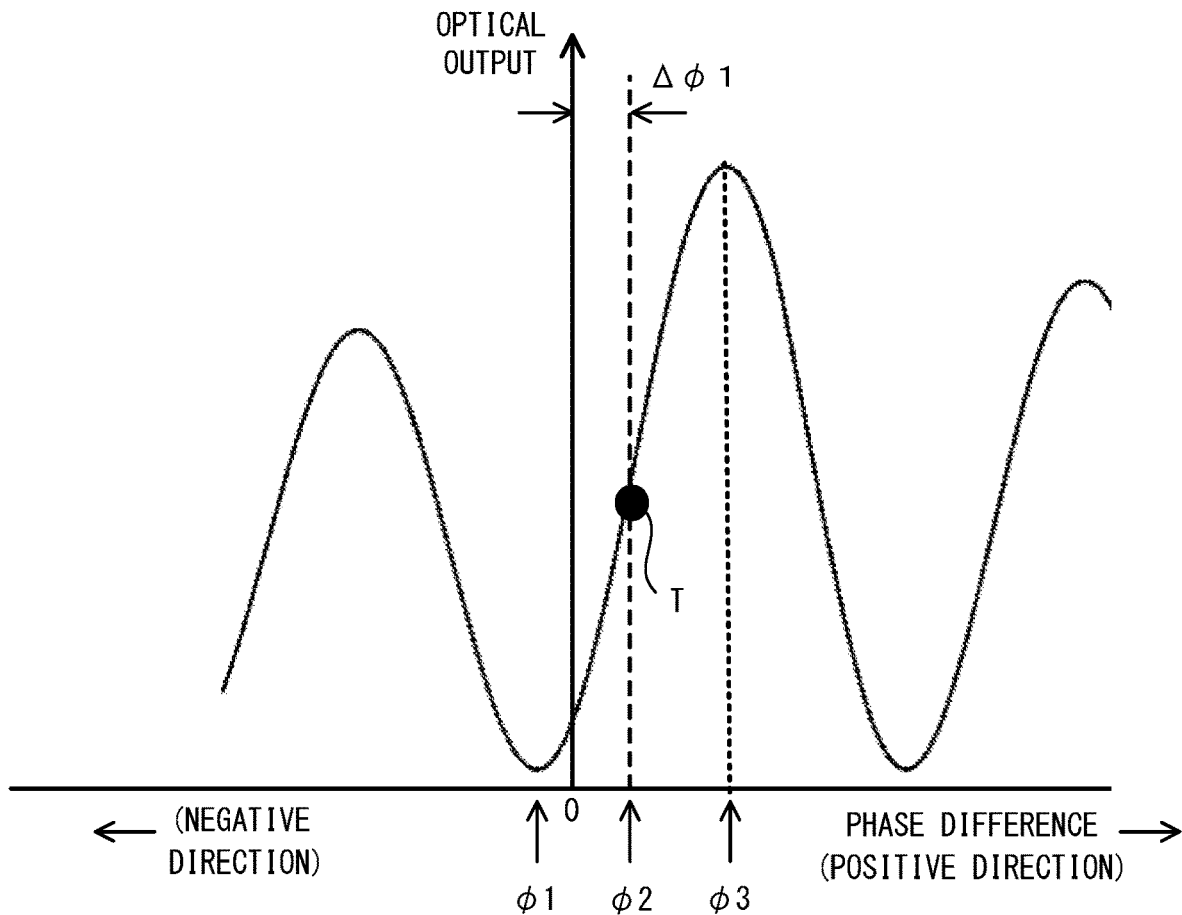
FIGS. 3A and 3B illustrate an example of a method for adjusting the operation point of the Mach-Zehnder interferometer.

FIG. 3 illustrates an example of a method for adjusting the operation point of the Mach-Zehnder interferometer. In this example, the Mach-Zehnder interferometer 11 has the characteristics illustrated in FIG. 3A. In FIG. 3A, the horizontal axis represents the difference between the phase of the output light of the first arm waveguide 11x and the phase of the output light of the second arm waveguide 11y. In the descriptions below, the difference may be referred to as "the phase difference of the Mach-Zehnder interferometer 11" or simply "the phase difference". Meanwhile, in FIG. 3A, "the phase difference=zero" represents the state in which the bias current x supplied to the first arm waveguide 11x and the bias current y supplied to the second arm waveguide 11y are both zero. In addition, in the descriptions below, the first arm waveguide and the second arm waveguide may be referred to as "the first arm", "the second arm", respectively.

The vertical axis of FIG. 3A represents the power of the light output from the Mach-Zehnder interferometer 11 when continuous wave light of a specified power is input to the Mach-Zehnder interferometer 11. As illustrated in FIG. 3A, the power of the output light of the Mach-Zehnder interferometer 11 changes periodically with respect to the phase difference of the Mach-Zehnder interferometer 11.

Here, it is preferable that the phase difference of the optical modulator 2 is adjusted so that the amplitude of the output optical signal becomes large. In the example illustrated in FIG. 3A, the operation point of the Mach-Zehnder interferometer 11 is optimal when the phase difference is $\phi 2$. Meanwhile, the phase difference $\phi 2$ corresponds to the midpoint of the phase difference ($\phi 3$) with which the power of the output light becomes maximum and the phase difference ($\phi 1$) with which the power of the output light becomes minimum, in the area in which the gradient of the power of the output light with respect to the phase difference is positive.

Figure 3B:
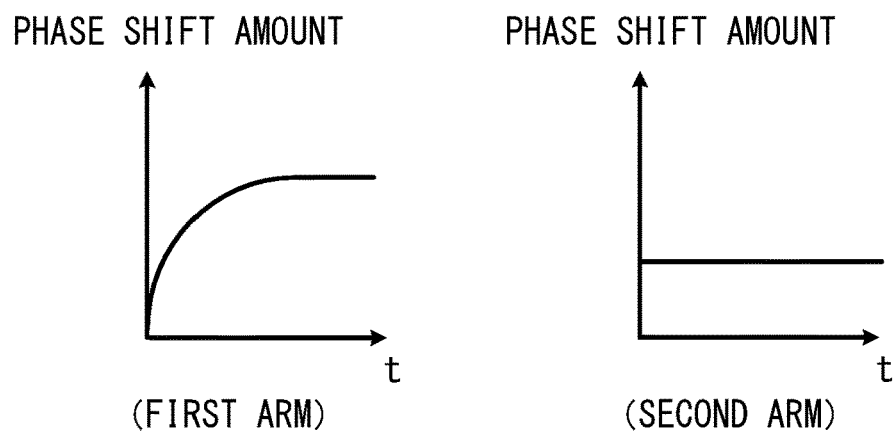

The optical modulator 2 has a function to optimize the operation point of the Mach-Zehnder interferometer 11. For example, when the Mach-Zehnder interferometer 11 has the characteristics illustrated in FIG. 3A, the optical modulator 2 makes the operation point of the Mach-Zehnder interferometer 11 shift in the positive direction. Here, in this example, it is assumed that the "shift in the positive direction" is realized by making the bias current of the first arm 11x large to increasing its phase shift. Therefore, the optical modulator 2 increases the phase shift amount of the first arm 11x gradually while maintaining the phase shift amount of the second arm 11y, as illustrated in FIG. 3B. At this time, the phase shift of the Mach-Zehnder interferometer 11 increases by $\Delta\phi 1$ by increasing the phase shift amount of the first arm 11x by $\Delta\phi 1$. As a result, the operation point of the Mach-Zehnder interferometer 11 is optimized.

However, the Mach-Zehnder interferometers have variations due to manufacturing. That is, the characteristics of the Mach-Zehnder interferometer are different for each device. Therefore, the optical modulator 2 performs the control of the operation point according to the characteristics of the Mach-Zehnder interferometer 11.

For example, when the Mach-Zehnder interferometer 11 has the characteristic illustrated in FIG. 4A, the optical modulator 2 makes the operation point of the Mach-Zehnder interferometer 11 shift in the negative direction. Here, in this example, it is assumed that the "shift in the negative direction" is realized by increasing the bias current, of the second arm 11y to increase its phase shift amount. Therefore, the optical modulator 2 gradually increases the phase shift amount of the second arm 11y while maintaining the phase shift amount of the first arm 11x. At this time, the phase shift of the Mach-Zehnder interferometer 11 decreases by $\Delta\phi 2$ by increasing the phase shift amount of the second arm 11y by $\Delta\phi 2$. As a result, the operation point of the Mach-Zehnder interferometer 11 is optimized.

The characteristics of each Mach-Zehnder interferometer 11 are measured before shipping. For example, the characteristics illustrated in FIG. 3A or FIG. 4A are obtained by the measurement. Here, in the measurement of the characteristics, continuous wave light of a specified power is input to the Mach-Zehnder interferometer 11. Then, the Mach-Zehnder characteristics information that represents the output optical power with respect to the phase difference of the Mach-Zehnder interferometer 11 is obtained by monitoring the power of the output light of the Mach-Zehnder interferometer 11 while changing the bias current of the Mach-Zehnder interferometer 11. Meanwhile, the characteristics of each Mach-Zehnder interferometer 11 may be measured at various temperatures. Then, the Mach-Zehnder characteristics information is stored in the memory 14, as illustrated in FIG. 2.

As described above, the Mach-Zehnder characteristics information represents the output optical power with respect to the phase difference of the Mach-Zehnder interferometer 11. Therefore, the controller 13 can recognize how the phase difference of the Mach-Zehnder interferometer 11 is to be controlled in order to optimize the operation point of the Mach-Zehnder interferometer 11, by referring to the Mach-Zehnder characteristics information. However, the actual characteristics of the Mach-Zehnder interferometer 11 may change due to aging degradation or the like. That is, the actual characteristics of the Mach-Zehnder interferometer 11 may have changed since the time when the Mach-Zehnder characteristics information was generated. Therefore, the controller 13 may roughly adjust the operation point of the Mach-Zehnder interferometer 11 according to the Mach-Zehnder characteristics information and after that, it may further perform fine adjustment of the operation point of the Mach-Zehnder interferometer 11 by feedback control using the result of monitoring by the photo detectors 12a, 12b.

FIG. 5 illustrate an example of the relationship between the current supplied to the arm of the Mach-Zehnder interferometer and the phase difference. In FIG. 5, the horizontal axis represents the bias current supplied to the arm waveguide (11x or 11y). In addition, the vertical axis represents the phase shift amount according to the bias current of the arm waveguide. Meanwhile, the in FIG. 5, it is assumed that the phase shift amount is zero when the bias current is not supplied.

In the region where the bias current is small (in FIG. 5, the region S), the gradient of the phase shift amount with respect to the change in the current is very large. For this reason, in the region S, a small change in the bias current causes a large change in the phase of the arm waveguide. That is, in the region S, it may not be easy to make the phase of the arm waveguide closer to a specified target phase.

As the bias current becomes larger, the gradient of the phase shift amount with respect to the change in the current becomes gradually smaller. For example, the gradient of the phase shift amount with respect to the change in the current is also large in the region A. However, compared to the region S, the gradient in the region A is small. In addition, in the region B, the gradient of the phase shift amount with respect to the change in the current is small. Thus, the gradient of the phase shift amount with respect to the change in the current is nonlinear with respect to the bias current.

When adjusting the operation point of the Mach-Zehnder interferometer 11, the controller 13 controls the bias current. However, as described above, in the region S, it is not easy to make the phase of the arm waveguide closer to a specified target phase. For this reason, the controller 13 supplies a specified offset current to both the first arm 11x and the second arm 11y. After that, the controller 13 makes the bias current of either the first arm 11x or the second arm 11y gradually increase. Meanwhile, in the descriptions below, the arm whose bias current is adjusted may be referred to as "the adjusted arm" and the other arm may be referred to as "the fixed arm".

Meanwhile, which of the arms, the first arm 11x or the second arm 11y is determined as the adjusted arm depends on the characteristics of the Mach-Zehnder interferometer 11. In addition, the amount of the bias current of the adjusted arm also depends on the characteristics of the Mach-Zehnder interferometer 11.

For example, in the case illustrated in FIG. 3A, the shift of the operation point of the Mach-Zehnder interferometer 11 by $\Delta\phi1$ in the positive direction is required. In this case, the first arm 11x is the adjusted arm, and the second arm 11y is the fixed arm. Then, the controller 13 increases the bias current of the first arm 11x so that the phase shift in the first arm 11x becomes larger by $\Delta\phi1$. At this time, the bias current of the second arm 11y is fixed. As a result, the phase difference of the Mach-Zehnder interferometer 11 becomes larger by $\Delta\phi1$.

Meanwhile, in the case illustrated in FIG. 4A, the shift of the operation point of the Mach-Zehnder interferometer 11 by $\Delta\phi2$ in the negative direction is required. In this case, the second arm 11y is the adjusted arm, and the first arm 11x is the fixed arm. Then, the controller 13 increases the bias current of the second arm 11y so that the phase shift in the first arm 11x becomes larger by $\Delta\phi2$. At this time, the bias current of the first arm 11x is fixed. As a result, the phase difference of the Mach-Zehnder interferometer 11 becomes smaller by $\Delta\phi2$.

FIG. 6 illustrates an example of a method for adjusting the phase difference of the Mach-Zehnder interferometer 11. In this example, the first arm 11x is the adjusted arm, and the second arm 11y is the fixed arm. That is, an adjustment for making the phase difference of the Mach-Zehnder interferometer 11 larger is performed. Meanwhile, in FIG. 6, the horizontal axis represents the time. Here, in a case in which the adjustment of the bias current is realized by repeating the current adjustment process in which the bias current is increased by a specified amount, the horizontal axis corresponds to the number of executions of the current adjustment process.

In the initial setting, the controller 13 controls the bias currents of the adjusted arm and the fixed arm to a specified offset value, as illustrated in FIG. 6A. In the descriptions below, the bias current that has been adjusted to the offset value may be referred to as an "offset current". The offset currents of the adjusted arm and the fixed arm are the same as each other. Therefore, as illustrated in FIG. 6B, the phase shift amounts of the adjusted arm and the fixed arm are the same as each other, and the phase difference of the Mach-Zehnder interferometer 11 is "zero". Meanwhile, it is assumed that, when the offset current is supplied, the phase shift amount of the adjusted arm is controlled to be the point A presented in FIG. 5 or FIG. 6B.

Next, the controller 13 controls the bias current of the adjusted arm. At this time, the controller 13 gradually increases the bias current of the adjusted arm so that the output optical power detected by the photo detectors 12a, 12b becomes closer to a target value. The target value corresponds to the optical power represented by the point T, in the example illustrated in FIG. 3A. Here, in this example, the controller 13 increases the bias current with respect to time in a linear manner. However, as illustrated in FIG. 5, the gradient of the phase shift amount with respect to the change in the current is nonlinear with respect to the bias current. Therefore, when the bias current linearly increases as illustrated in FIG. 6A, the phase shift amount of the adjusted arm increases along the curve illustrated in FIG. 5.

When the output optical power of the Mach-Zehnder interferometer 11 becomes sufficiently close to be the target value, the controller 13 terminates the adjustment of the bias current. By this adjustment, the phase shift amount of the adjusted arm is changed from the point A to the point B presented in FIG. 5 or FIG. 6B. As a result, the phase difference of the Mach-Zehnder interferometer 11 increases, and its operation point is optimized.

As described above, in the procedure for adjusting the phase difference of the Mach-Zehnder interferometer 11, the offset currents are supplied to both the first arm 11x and the second arm 11y so that the adjustment is not performed in the region (in FIG. 5, the region S) in which the gradient of the phase shift amount with respect to the change in the current is very large. However, the offset currents do not contribute to the adjustment of the Mach-Zehnder interferometer 11 because the offset currents supplied to the first arm 11x and the second arm 11y are the same as each other and the phase difference is maintained. For this reason, in the method illustrated in FIG. 6, an excessive bias current is required for adjusting the phase difference of the Mach-Zehnder interferometer 11 to be the target value.

In addition, as described above, the Mach-Zehnder interferometers have variations due to manufacturing, and therefore, the characteristics of the Mach-Zehnder interferometer are different for each device. For this reason, for example, the operation point of the Mach-Zehnder interferometer 11 may be optimized by the current control in the region A presented in FIG. 5, or the operation point may be optimized by the current control in the region B. However, when the bias current becomes large and the phase shift amount in the arm waveguide becomes large, the optical transmission loss in the Mach-Zehnder interferometer 11 becomes large. Then, in order to generate a modulated optical signal of a specified output optical power in the condition in which the optical transmission loss is large, it is necessary to compensate for the optical transmission loss by increasing the output power of the laser light source 3. This causes an increase in the current consumption of the optical module 1 that includes the optical modulator 2 and the laser light source 3.

First Embodiment

FIG. 7 illustrates an example of a method for adjusting the phase difference of the Mach-Zehnder interferometer in the optical modulator according to the first embodiment. In this example, the first arm 11x is the adjusted arm, and the second arm 11y is the fixed arm. That is, an adjustment for making the phase difference of the Mach-Zehnder interferometer 11 larger is performed. Meanwhile, in this example, the phase difference of the Mach-Zehnder interferometer 11 is adjusted by repeating the current adjustment process in which the bias current is increased by $\Delta i$. Therefore, the horizontal axis represents the number of executions of the current adjustment process.

FIG. 8 illustrates an example of the change in the current supplied to the arms of the Mach-Zehnder interferometer and in the phase shift, in the adjustment illustrated in FIG. 7. Meanwhile, the points A, C through F presented in FIG. 7 and FIG. 8 correspond with each other.

Figure 7A:
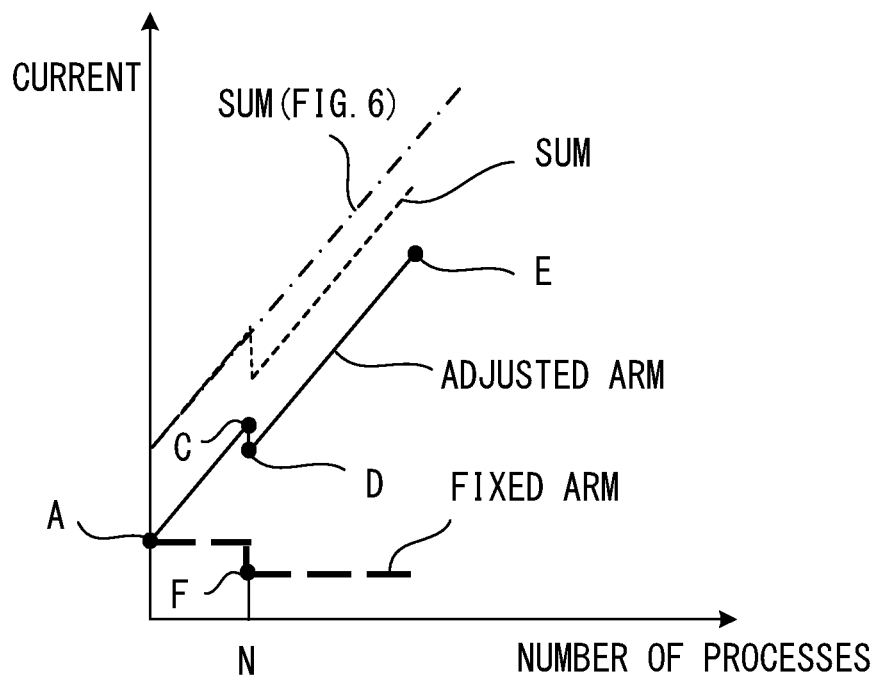
FIGS. 7A and 7B illustrate an example of a method for adjusting the phase difference of the Mach-Zehnder interferometer in the optical modulator according to the first embodiment.
Figure 7B:
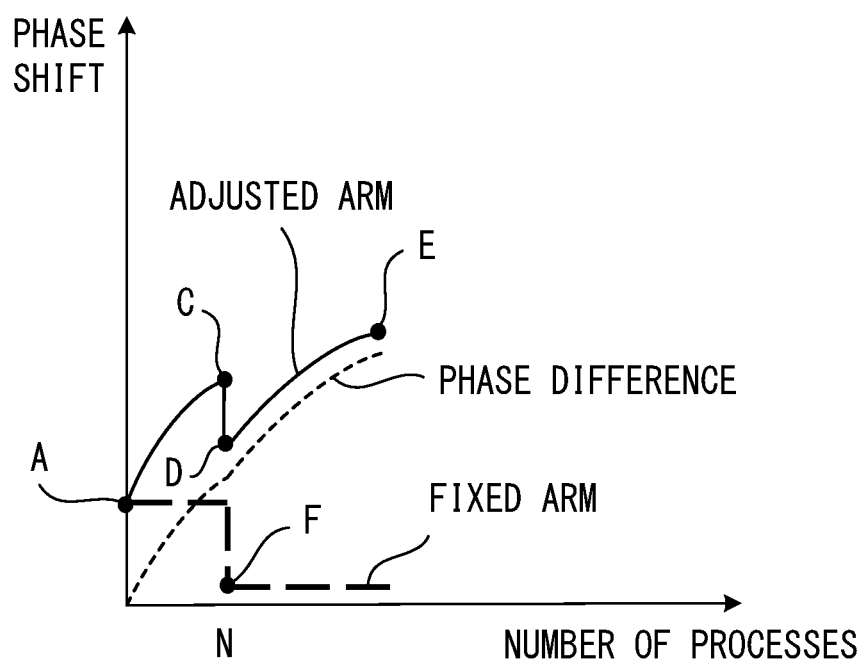

The controller 13 supplies the offset currents to the adjusted arm and the fixed arm in the initial setting, as illustrated in FIG. 7A. At this time, the offset currents supplied to the adjusted arm and the fixed arm are the same as each other. Therefore, as illustrated in FIG. 7B, the phase shift, amounts of the first arm waveguide 11x and the second arm waveguide 11y are the same as each other, and the phase difference of the Mach-Zehnder interferometer 11 is "zero". It is assumed that, when the offset currents are supplied, the state of each arm is controlled to be the point A presented in FIG. 7 and FIG. 8.

Next, the controller 13 controls the bias current, of the adjusted arm. At this time, the controller 13 repeatedly executes the current adjustment process until the gradient of the phase shift amount with respect to the change in the current reaches the target value. The target value is, for example, ¼ of the gradient obtained at the time of the initial setting, while this is not a particular limitation (in FIG. 8, the gradient is at the point A). For example, when the gradient at the point C is ¼ of the gradient at the point A, the controller 13 increases the bias current of the adjusted arm to the current value corresponding to the point C. Note that the Mach-Zehnder characteristics information that represents the characteristics of the Mach-Zehnder interferometer 11 is stored in the memory 14. Therefore, the controller 13 can determine, the current value corresponding to the point C by referring to this Mach-Zehnder characteristics information.

When the current adjustment process is repeatedly executed and the bias current of the adjusted arm increases to the current value corresponding to the point C, the controller 13 resets the bias current of the fixed arm (that is, the second arm 11y). Specifically, the controller 13 makes the bias current of the fixed arm decrease from the offset current value at the time of the initial setting to a second offset current value. The second offset current value is, for example, ½ of the offset current value, while this is not a particular limitation. However, the second offset current value may also be a sufficiently small prescribed value or may be "zero". Meanwhile, in the descriptions below, it is assumed that when the current adjustment process is executed N times, the bias current of the adjusted arm reaches the current value corresponding to the point C.

The controller 13 adjusts the bias current of the adjusted arm in accordance with the reset of the bias current of the fixed arm. At this time, the controller 13 adjusts the bias current of the adjusted arm so that the phase difference of the Mach-Zehnder interferometer 11 becomes continuous before and after the reset of the bias current of the fixed arm. Specifically, the controller 13 adjusts the bias current of the adjusted arm so that the phase difference of the Mach-Zehnder interferometer 11 at the time when the bias current of the fixed arm is controlled to be the second offset current value is the same as the phase difference of the Mach-Zehnder interferometer 11 at the time when the bias current of the fixed arm is controlled to be the offset current value.

The change in the bias current of each arm at the time of reset is determined in advance according to the characteristics of the Mach-Zehnder interferometer 11. That is, reset information that represents the change in the bias current at the time of reset is created in advance and is stored in the memory 14. In the example illustrated in FIG. 9, the bias current of the fixed arm is reset from 1.00 mA (the offset current value) to 0.50 mA (the second offset current value). In addition, the bias current of the adjusted arm is adjusted from 13.37 mA to 9.41 mA.

By the reset described above, the state of the fixed arm shifts from the point A to the point F in FIG. 7 and FIG. 8. Meanwhile, the state of the adjusted arm shifts from the point C to the point D. At this time, as illustrated in FIG. 7B, the phase difference of the Mach-Zehnder interferometer 11 does not change.

After that, the controller 13 executes the N+1th and subsequent current adjustment processes. That is, the controller 13 gradually increases the bias current of the adjusted arm so that the output optical power detected by the photo detectors 12a, 12b becomes closer to be the target value, as illustrated in FIG. 7A. During this process, the bias current of the fixed arm is maintained at the second offset current value. Then, when the output optical power of the Mach-Zehnder interferometer 11 reaches the target value (that is, when the difference between the output optical power and the target value becomes sufficiently small), the process for adjusting the phase difference of the Mach-Zehnder interferometer 11 is terminated. During this process, a data signal may be given to the Mach-Zehnder interferometer 11. In this case, it is preferable that an appearance rate of H-level is equal to an appearance rate of L-level in the data signal. As a result, the operation point of the Mach-Zehnder interferometer 11 is optimized. Meanwhile, the point E presented in FIG. 7 and FIG. 8 indicates the state of the adjusted arm at the time when the output optical power of the Mach-Zehnder interferometer 11 has reached the target value.

After the operation point of the Mach-Zehnder interferometer 11 is optimized, the bias current of each arm is fixed. Then, when the data signal is given, the optical modulator 2 generates a modulated optical signal that represents the data signal.

As described above, in the first embodiment, when the bias current of the adjusted arm increases and the gradient of the phase shift amount reaches the target value, the bias current of each arm is reset. Therefore, as illustrated in FIG. 7A, the sum of the bias currents supplied to each arm for optimizing the operation point of the Mach-Zehnder interferometer 11 is reduced compared with that according to the method illustrated in FIG. 6.

In addition, in the method illustrated in FIG. 6, in order to optimize the operation point of the Mach-Zehnder interferometer 11, it is necessary to increase the bias current of the adjusted arm to the point B illustrated in FIG. 5 or FIG. 8.

In contrast to this, in the first embodiment, the operation point of the Mach-Zehnder interferometer 11 is optimized by increasing the bias current of the adjusted arm to the point E illustrated in FIG. 8. Here, when the bias current becomes small, the phase shift amount also becomes small, and the optical transmission loss of the optical modulator 2 also becomes small. Therefore, in the case in which a modulated optical signal of a specified output optical power is generated, the input power to the Mach-Zehnder interferometer 11 may be reduced, and it becomes possible to make the driving current of the laser light source 3 small. As a result, the current consumption of the optical module 1 including the optical modulator 2 and the laser light source 3 is reduced.

Figure 10:
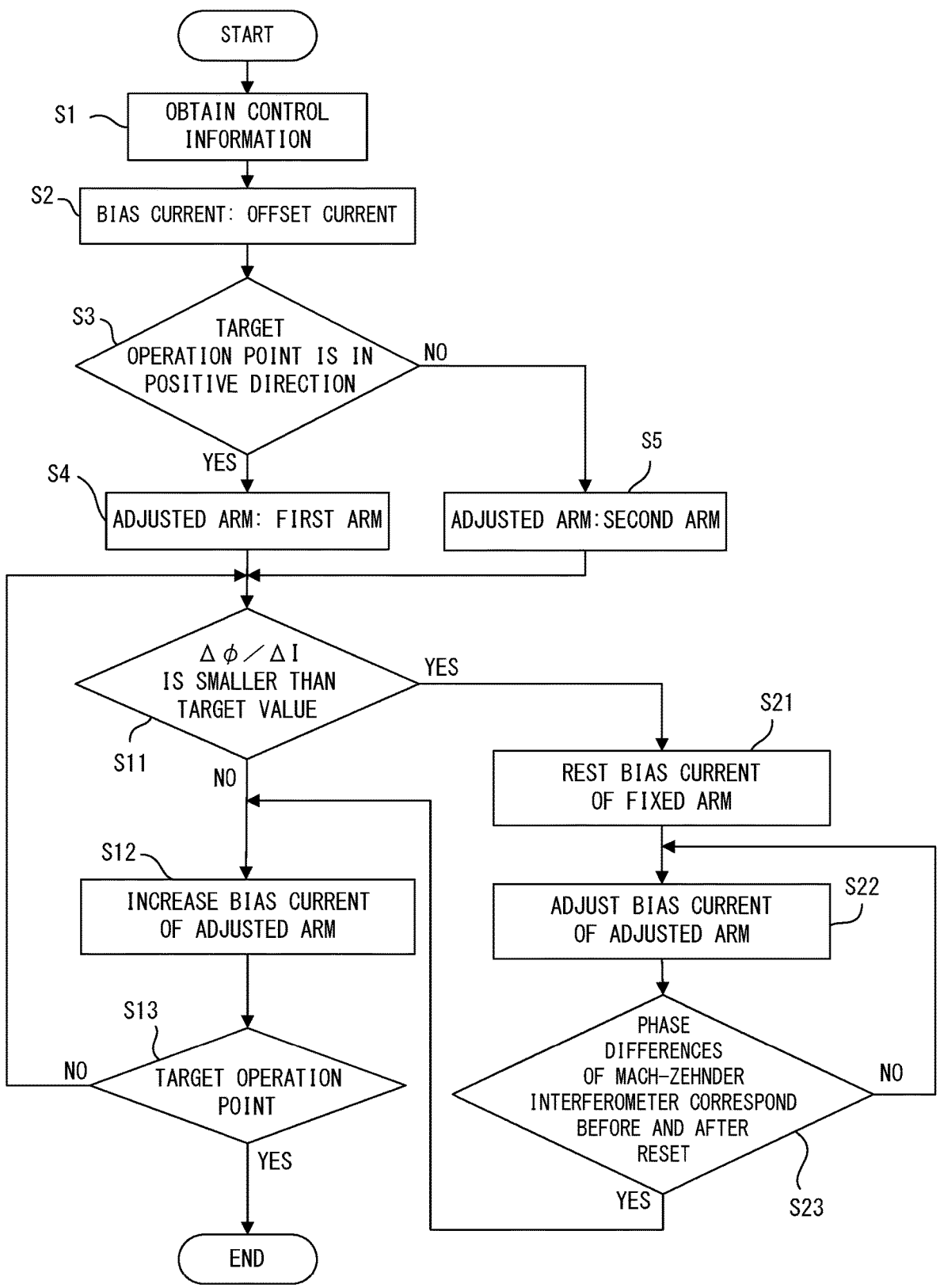
FIG. 10 is a flowchart illustrating an example of a method for controlling the operation point of the Mach-Zehnder interferometer.

FIG. 10 is a flowchart illustrating an example of a method for controlling the operation point of the Mach-Zehnder interferometer 11. Meanwhile, when the process of this flowchart is executed, continuous wave light of a specified optical power is input from the laser light source 3 to the optical modulator 2.

In S1, the controller 13 obtains control information from the memory 14. The control information includes the Mach-Zehnder characteristics information that represents the characteristics of the Mach-Zehnder interferometer 11, and the reset information presented in FIG. 9.

In S2, the controller 13 supplies the offset current to each of the first arm and the second arm. That is, the bias currents of the first arm and the second arm are respectively controlled to be the offset value.

In S3, the controller 13 determines whether the target operation point of the Mach-Zehnder interferometer 11 is located in the positive direction or located in the negative direction, according to the Mach-Zehnder characteristics information. When it is necessary to make the phase difference of the Mach-Zehnder interferometer 11 larger in order to optimize the operation point of the Mach-Zehnder interferometer 11, it is determined that the target operation point is located in the positive direction. On the other hand, when it is necessary to make the phase difference of the Mach-Zehnder interferometer 11 smaller in order to optimize the operation point of the Mach-Zehnder interferometer 11, it is determined that the target operation point is located in the negative direction. In the example illustrated in FIG. 3A, the target operation point is located in the positive direction. In addition, in the example illustrated in FIG. 4A, the target operation point is located in the negative direction.

When the target operation point is located in the positive direction, the controller 13 selects the first arm as the adjusted arm and selects the second arm as the fixed arm in S4. When the target operation point is located in the negative direction, the controller 13 selects the second arm as the adjusted arm and selects the first arm as the fixed arm in S5.

In S11, the controller 13 compares the gradient with respect to the bias current ($\Delta\phi\Delta I$) in the adjusted arm and the target value. Here, the bias current of the adjusted arm is controlled by the controller 13, and therefore, the controller 13 has recognized the bias current of the adjusted arm. Accordingly, the controller 13 can estimate the gradient of the phase difference corresponding to the bias current by referring to the Mach-Zehnder characteristics information.

When the gradient of the phase difference is larger than or equal to the target value, the controller 13 makes the bias current of the adjusted arm larger by a prescribed amount in S12. Next, in S13, the controller 13 determines whether or not the operation point of the Mach-Zehnder interferometer 11 has been controlled to be the target operation point. That is, the controller 13 determines whether or not the phase difference of the Mach-Zehnder interferometer 11 has been controlled to be the target value.

When the operation point of the Mach-Zehnder interferometer 11 has not been controlled to be the target operation point, the processing of the controller 13 returns to S11. That is, the controller 13 repeatedly executes S11 through S13 until the operation point of the Mach-Zehnder interferometer 11 is controlled to be the target operation point. Then, when the operation point of the Mach-Zehnder interferometer 11 is controlled to be the target operation point, the process of the controller 13 is terminated.

However, when the gradient of the phase difference of the Mach-Zehnder interferometer 11 becomes smaller than the target value before the operation point of the Mach-Zehnder interferometer 11 is controlled to be the target operation point (S11: Yes), the processing of the controller 13 proceeds to 821. For example, when it is necessary to shift the operation point of the Mach-Zehnder interferometer 11 by a large amount, it is necessary to make the bias current of the adjusted arm sufficiently large. In this case, the gradient of the phase difference of the Mach-Zehnder interferometer 11 may become smaller than the target value before the operation point of the Mach-Zehnder interferometer 11 is controlled to be the target operation point.

In S21, the controller 13 resets the bias current of the fixed arm. At this time, the bias current of the fixed arm changes from the offset value set in S2 to a second offset value that is smaller than the offset value.

In S22 through S23, the controller 13 adjusts the bias current of the adjusted arm in accordance with the reset of the bias current of the fixed arm. At this time, the controller 13 adjusts the bias current of the adjusted arm so that the phase difference of the Mach-Zehnder interferometer 11 become continuous before and after the reset of the bias current of the fixed arm. Specifically, the controller 13 adjusts the bias current of the adjusted arm so that the phase difference of the Mach-Zehnder interferometer 11 at the time when the bias current of the fixed arm is controlled to be the offset value and the phase difference of the Mach-Zehnder interferometer 11 at the time when the bias current of the fixed arm is controlled to be the second offset value correspond with each other.

After this, the processing of the controller 13 proceeds to S12. That is, after the reset process in S21-S23 is terminated, the controller 13 repeatedly executes S11-S13 (that is, the current adjustment process) until the operation point of the Mach-Zehnder interferometer 11 is controlled to be the target operation point. As a result, when the operation point of the Mach-Zehnder interferometer 11 is controlled to be the target operation point, the processing of the controller 13 is terminated.

Figure 11:
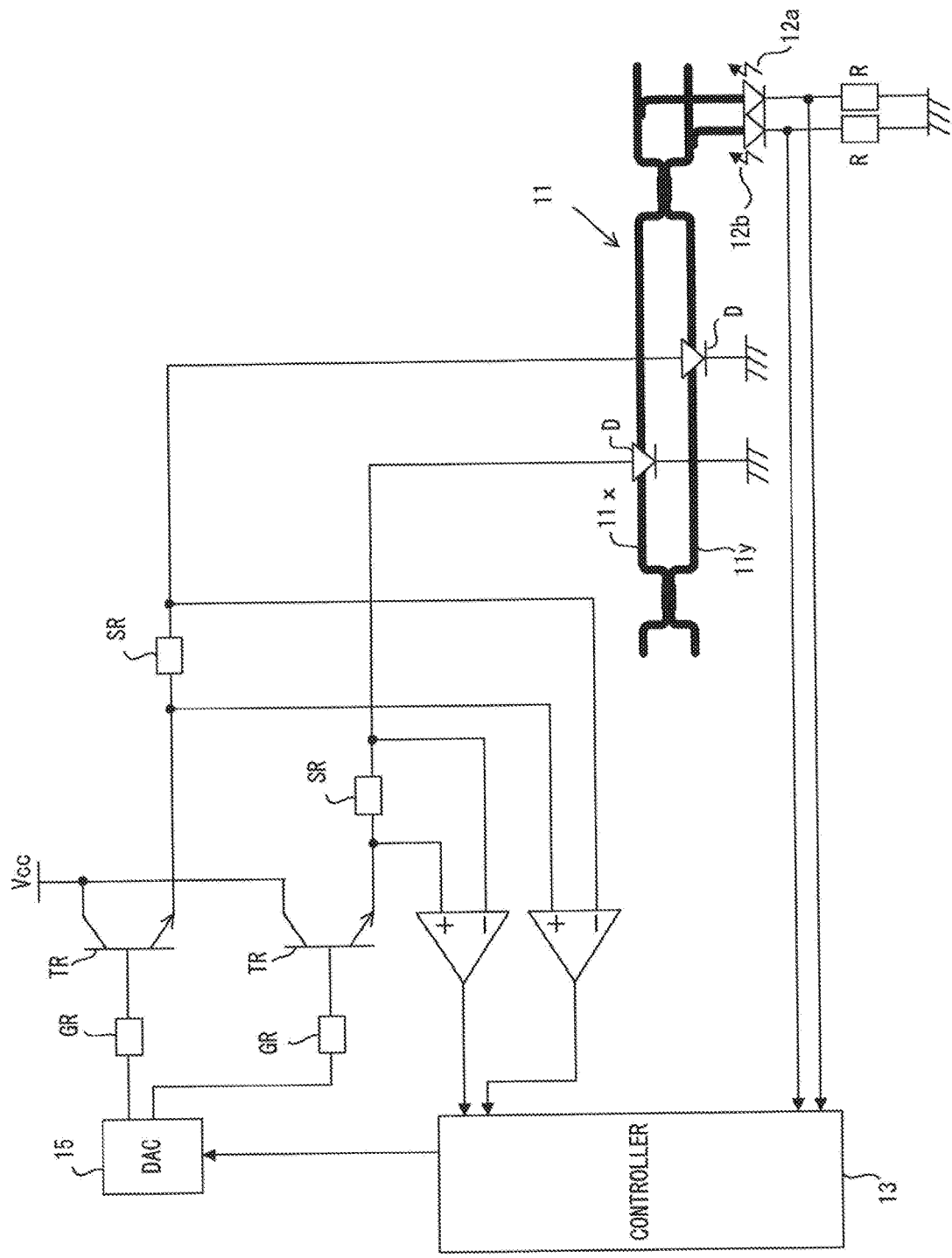
FIG. 11 illustrates an example of the circuit configuration of an optical modulator.

FIG. 11 illustrates an example of the circuit configuration of the optical modulator 2. In FIG. 11, the memory 14 and the voltage-to-current converters 17 are omitted.

The controller 13 generates a bias signal representing the value of the current supplied to each arm of the Mach-Zehnder interferometer 11. The bias signal is converted into an analog signal by the digital-to-analog converter 15. The controller 13 and the digital-to-analog converter 15 are connected by an I2C (Inter-Integrated Circuit) or an SPI (Serial Peripheral Interface), for example.

The voltage-to-current converter 16 is configured using a resistor element and a transistor. The bias signal output from the digital-to-analog converter 15 is given to the gate of a transistor TR via a resistor GR. Therefore, the transistor TR generates a current that corresponds to the voltage value of the bias signal. The output current of the transistor TR is used as the bias current of the Mach-Zehnder interferometer 11. Meanwhile, a diode D for causing the bias current flow is provided for each arm of the Mach-Zehnder interferometer 11.

The output current of the transistor TR (that is, the bias current) is converted into a voltage signal by a shunt resistor SR, amplified by an operational amplifier and guided to the controller 13. Accordingly, the controller 13 can monitor the bias current.

The photo detectors 12a, 12b convert the output light from the Mach-Zehnder interferometer 11 into an electric signal. Then, the output signals of the photo detectors 12a, 12b are guided to the controller 13. Therefore, the controller 13 can monitor the power of the output light of the Mach-Zehnder interferometer 11.

Second Embodiment

In the first embodiment, when optimizing the operation point of the Mach-Zehnder interferometer 11, the current adjustment process is repeatedly performed. Here, the amount of increase in the bias current in each current adjustment process is fixed. For this reason, as illustrated in FIG. 7A, the bias current of the adjusted arm increases linearly with respect to the number of executions of the current adjustment process (or the time).

In the second embodiment, when optimizing the operation point of the Mach-Zehnder interferometer 11, the current adjustment process is also repeatedly performed. However, in the second embodiment, the amount of increase in the bias current in each current adjustment process is not necessarily fixed, and for example, the amount of increase in the bias current is changed according to the amount of the bias current.

FIG. 12 illustrate an example of a method for adjusting the phase difference of the Mach-Zehnder interferometer in the optical modulator according to the second embodiment. In a similar manner as in the example illustrated in FIG. 7, the first am 11x is the adjusted arm, and the second arm 11y is the fixed arm in this example as well. That is, an adjustment for making the phase difference of the Mach-Zehnder interferometer 11 larger is performed. In addition, the current adjustment process for making the bias signal large is repeatedly performed. Therefore, the horizontal axis represents the number of executions of the current adjustment process.

The bias current of the adjusted arm is controlled so that the phase shift amount of the adjusted arm increases approximately linearly with respect to the number of executions of the current adjustment process. In this case, in the region in which the gradient of the phase shift amount is large (that is, the region in which the bias current is small), the amount of increase in the bias current in one current adjustment process is small. In the region in which the gradient of the phase shift amount is small (that is, the region in which the bias current is large), the amount of increase in the bias current in one current adjustment process is large.

FIG. 13 illustrates an example of the relationship between the bias current and the amount of increase in the bias current in the current adjustment process. In this example, the amount of increase in the bias current is set with respect to the range of the bias current of the adjusted arm. Note that Δi has been determined in advance.

The processing on the controller 13 is substantially the same in the first embodiment and in the second embodiment. That is, in the second embodiment, the controller 13 also optimizes the operation point of the Mach-Zehnder interferometer 11 according to the flowchart presented in FIG. 10. However, in the second embodiment, the controller 13 controls the bias current of the adjusted arm using the correspondence illustrated in FIG. 13.

As described above, in the second embodiment, it is possible to reduce the number of current adjustment processes executed for optimizing the operation point of the Mach-Zehnder interferometer 11 because the amount of increase in the bias current is large in the region in which the gradient of the phase shift amount is small. That is, the time required for optimizing the operation point of the Mach-Zehnder interferometer 11 is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A Mach-Zehnder optical modulator comprising:
a Mach-Zehnder interferometer that includes a first arm and a second arm formed on a silicon substrate;
a processor that generates a bias signal indicating bias current of the first arm and the second arm; and
a converter that converts the bias signal into the bias current,
the processor is configured to
control the bias current of the first arm and the bias current of the second arm respectively to be a first offset value,
repeatedly perform a current adjustment process to increase the bias current of the first arm until a gradient of a phase shift amount of the first arm with respect to the bias current of the first arm reaches a specified target value,
control the bias current of the second arm to be a second offset value that is smaller than the first offset value,
repeatedly perform the current adjustment process to increase the bias current of the first arm until a phase difference of the Mach-Zehnder interferometer reaches a specified target phase difference, and
output the bias signal indicating the bias current, and
the converter converts the bias signal into the bias current and supplies the bias current to the first arm and the second arm.

2. The Mach-Zehnder optical modulator according to claim 1, wherein the phase difference of the Mach-Zehnder interferometer represents the difference between a phase of output light of the first arm and a phase of output light of the second arm at a time when a data signal is given to the Mach-Zehnder interferometer.

3. The Mach-Zehnder optical modulator according to claim 1, wherein when the gradient of a phase shift amount of the first arm with respect to the bias current of the first arm reaches a target value, the processor changes the bias current of the second arm from the first offset value to the second offset value and also controls the bias current of the first arm so that the phase difference of the Mach-Zehnder interferometer at a time when the bias current of the second arm is controlled to be the first offset value and the phase difference of the Mach-Zehnder interferometer at a time when the bias current of the second arm is controlled to be the second offset value correspond with each other.

4. The Mach-Zehnder optical modulator according to claim 1, further comprising a memory configured to store information representing a characteristic of the Mach-Zehnder interferometer, wherein the processor is configured to
- determine whether to make the phase difference of the Mach-Zehnder interferometer larger or smaller according to the information, and
- specify one of a pair of arms of the Mach-Zehnder interferometer as the first arm and specify the other one of the pair of arms of the Mach-Zehnder interferometer as the second arm according to whether to make the phase difference of the Mach-Zehnder interferometer larger or smaller.

5. The Mach-Zehnder optical modulator according to claim 1, wherein the processor controls the bias current of the first arm so that the phase shift amount of the first arm increases approximately linearly with respect to a number of executions of the current adjustment process.

6. An optical module comprising:
- a Mach-Zehnder optical modulator; and
- a light source that generates continuous wave light to be input to the Mach-Zehnder optical modulator, the Mach-Zehnder optical modulator includes:
  - a Mach-Zehnder interferometer that includes a first arm and a second arm formed on a silicon substrate,
  - a processor that generates a bias signal indicating bias current of the first arm and the second arm, and
  - a converter that converts the bias signal into the bias current, and the processor is configured to
  - control the bias current of the first arm and the bias current of the second arm respectively to be a first offset value,
  - repeatedly perform a current adjustment process to increase the bias current of the first arm until a gradient of a phase shift amount of the first arm with respect to the bias current of the first arm reaches a specified target value,
  - control the bias current of the second arm to be a second offset value that is smaller than the first offset value,
  - repeatedly perform the current adjustment process to increase the bias current of the first arm until a phase difference of the Mach-Zehnder interferometer reaches a specified target phase difference, and
  - output the bias signal indicating the bias current, and the converter converts the bias signal into the bias current and supplies the bias current to the first arm and the second arm.

7. A method of adjusting a bias of a Mach-Zehnder optical modulator that includes a Mach-Zehnder interferometer comprising a first arm and a second arm formed on a silicon substrate, the method comprising:
- controlling bias current of the first arm and bias current of the second arm respectively to be a first offset value;
- repeatedly performing a current adjustment process to increase the bias current of the first arm until a gradient of a phase shift amount of the first arm with respect to the bias current of the first arm reaches a specified target value;
- controlling the bias current of the second arm to be a second offset value that is smaller than the first offset value; and
- repeatedly performing the current adjustment process to increase the bias current of the first arm until a phase difference of the Mach-Zehnder interferometer reaches a specified target phase difference.

* * * * *